United States Patent [19]
Anderson et al.

[11] Patent Number: 6,106,942
[45] Date of Patent: Aug. 22, 2000

[54] LIQUID CRYSTALLINE POLYMER MONOFILAMENTS HAVING IMPROVED ADHESION CHARACTERISTICS

[75] Inventors: Norman S. Anderson, Davidson; John D. Gibbon, Charlotte, both of N.C.; M. Ishaq Haider, Bernardsville, N.J.; Gerard Lees, Charlotte, N.C.

[73] Assignee: Celanese Acetate LLC, Charlotte, N.C.

[21] Appl. No.: 09/204,653

[22] Filed: Dec. 2, 1998

[51] Int. Cl.$^7$ .................................................. D01F 6/00
[52] U.S. Cl. ............................................ 428/375; 428/387
[58] Field of Search ..................... 252/8.7, 8.6; 428/375, 428/387

[56] References Cited

U.S. PATENT DOCUMENTS

| | | | |
|---|---|---|---|
| 3,997,450 | 12/1976 | Steinmiller | 252/8.7 |
| 4,183,895 | 1/1980 | Luise . | |
| 4,294,883 | 10/1981 | Hawkin | 428/361 |
| 4,468,364 | 8/1984 | Ide . | |
| 4,910,057 | 3/1990 | Ide et al. . | |
| 5,232,742 | 8/1993 | Chakiravarti | 428/387 |
| 5,246,776 | 9/1993 | Meraldi et al. . | |
| 5,358,648 | 10/1994 | Chakiravarti | 428/387 |
| 5,427,165 | 6/1995 | Balestra et al. . | |
| 5,464,546 | 11/1995 | Bialas et al. | 252/8.6 |
| 5,478,485 | 12/1995 | Bialas et al. | 252/8.6 |
| 5,525,243 | 6/1996 | Ross | 252/8.6 |

FOREIGN PATENT DOCUMENTS

| | | |
|---|---|---|
| 4-333616 | 11/1992 | Japan . |

OTHER PUBLICATIONS

D.E. Turrek et al., "The effect of die aspect ratio on the rheological properties of a thermotropic copolyester"; *J. Rheology*, 36 (6): 1057–1078 (1992).

A. Kaito et al., "Effects of Shear Rate on the Molecular Orientation in Extruded Rods of a Thermotropic Liquid Crystalline Polymer"; *J. Applied Poly. Sci.* 55: 1489–1493 (1995).

"Liquid crystalline Polymers", *Encyclopedia of Polymer Science and Engineering*, vol. 9, (J. Wiley & Sons, New York 1987) pp. 1–7.

"Liquid Crystalline Materials", *Kirk–Othmer Encyclopedia of Chemical Technology*, vol. 15 (J. Wiley & Sons, New York 1995), pp. 372–409.

*Primary Examiner*—N Edwards
*Attorney, Agent, or Firm*—Walter M. Douglas

[57] ABSTRACT

The invention is directed to LCP monofilaments and yarn made therefrom which have improved adhesion properties, said monofilaments, and yarn made therefrom, comprising a liquid crystalline polymer filament having a finish selected from the group consisting of esters formed between (a) pentaerythritol and saturated polyols of up to 10 carbon atoms and 2 to 6 hydroxyl groups, and (b) a carboxylic acid of formula $C_xH_{2x-1}COOH$, wherein x is from 2 to 20, and wherein 2 to 6 of the hydroxy functions are converted to ester functions. In a preferred embodiment of the invention the finish is an ester formed from the reaction of pentaerythritol and a carboxylic acid of formula $C_xH_{2x-1}COOH$, wherein x is from 2 to 20, and preferably between 14 and 20. The most preferred esters are pentaerythritol tetrapelargonate and pentaerythritol tetraisostearate.

12 Claims, No Drawings

LIQUID CRYSTALLINE POLYMER MONOFILAMENTS HAVING IMPROVED ADHESION CHARACTERISTICS

FIELD OF THE INVENTION

This invention relates to liquid crystalline polymer (LCP) monofilaments, and in particular to LCPs having improved adhesion characteristics.

BACKGROUND OF THE INVENTION

Thermotropic liquid crystalline polymers (LCPs) are an important class of polymers, which are generally wholly aromatic molecules containing a variety of heteroatom linkages including ester and/or esteramide linkages. Upon heating to sufficiently high temperature, LCPs melt to form a liquid crystalline melt phase (often referred to as "anisotropic phase") rather than an isotropic melt. Generally, LCPs consist of linear ("rigid rod") molecules that can line up to yield the desired liquid crystalline order. As a result, LCPs feature low melt viscosity and thus improved performance and processabilities.

Because LCPs orient to form "rigid rod" linear molecules, LCPs exhibit extremely high mechanical properties. Thus, it is well known in the art that LCPs can be formed into shaped articles, such as films, rods, pipes, fibers, and various other molded articles. In addition, it is also known in the art that LCPs, particularly in the fiber form, exhibit exceptionally high mechanical properties after a heat treatment process. However, all of the known methods in the art describe formation of only the low denier fibers, e.g., of about 5 deniers per filament (dpf), which exhibit high mechanical properties in their as-spun as well as heat-treated forms. Furthermore, there are no reports in the prior art that filaments having multilobal cross-section can be made from LCPs. More importantly, filaments of LCPs generally do not adhere to various other similar or dissimilar materials.

Numerous patents and publication describe LCPs, method of making LCPs, and the characteristics and uses of such LCPs. Among these are the following, all of whose teachings are incorporated herein by reference:

U.S. Pat. No. 4,183,895 describes a process for treating anisotropic melt forming polymeric products. A process of heat treatment reportedly yielded fibers having enhanced mechanical properties, and the fiber tenacity was reported as being increased by at least 50% and to at least 10 grams per denier.

U.S. Pat. No. 4,468,364 describes a process for extruding thermotropic liquid crystalline polymers (LCPs). It is claimed that extrusion of an LCP through a die orifice having an L/D ratio of less than 2 (preferably 0), and at a draw-down ratio of less than 4 (preferably 1), yields filaments featuring high mechanical properties.

U.S. Pat. No. 4,910,057 describes a highly elongated member of substantially uniform cross-sectional configuration which is capable of improved service as a stiffening support in an optical fiber cable.

U.S. Pat. No. 5,246,776 describes an aramid monofilament and method of making the same.

U.S. Pat. No. 5,427,165 describes a reinforcement assemblage formed at least in part of continuous monofilaments of liquid crystal organic polymer(s). The polymers used therein are primarily aramids.

Japanese laid open Patent No. 4-333616 describes a method of manufacturing filaments of 50 to 2000 dpf from molten liquid crystalline polymers. The heat-treated mechanical properties of these filaments were significantly inferior to the properties reported for the corresponding lower denier filaments of 5 to 10 dpf J. Rheology 1992, Vol. 36 (p. 1057–1078) reports a study of the rheology and orientation behavior of a thermotropic liquid crystalline polyester using capillary dies of different aspect ratios.

J. Appl. Polym. Sci. 1995, Vol. 55 (p. 1489–1493) reports orientation distribution in extruded rods of a thermotropic liquid crystalline polyesters. The orientation function increases with increasing apparent shear rate from 166 to 270 $sec^{-1}$, but decreases with increasing apparent shear rate from 566 to 780 $sec^{-1}$.

Although much work has been done and many improvements have been made regarding LCPs, one area in which further improvement is desired is with regard to improving the adhesion characteristics of LCPs to each other and to other materials, for example, to materials made of rubber or having a rubber coating.

Accordingly, it is an object of this invention to provide thermotropic LCP filaments, fibers, yarns and monofilaments, and cords made therefrom, which have improved adhesion characteristics, and in particular to provide LCP filaments, fibers, yarns and monofilaments, and cords made therefrom, having improved adhesion characteristics to rubber and rubber coated materials or substances.

It is a further object of this invention to provide heavy denier LCP filaments, fibers, yarns and monofilaments, and cords made therefrom, having improved adhesion characteristics, and in particular to provide for LCP filaments, fibers, yarns and monofilaments, and cords made therefrom, of greater than about 50 denier which have improved adhesion characteristics to rubber and rubber coated materials.

It is an additional object of this invention to identify substances which can be applied to LCP filaments, fibers, yarns and monofilaments, and cords made therefrom, to improve the adhesion of such filaments, fibers, yarns and monofilaments, and cords made therefrom, to rubber and rubber coated materials.

Another object of this invention is to provide a process for "treating" or "finishing" LCP filaments, fibers, yarns and monofilaments, and cords made therefrom, in order to provide filaments, fibers, yarns and monofilaments, and cords made therefrom, which have improved adhesion characteristics to rubber and rubber coated materials.

Additional embodiments will become apparent to those skilled in the art by means of the specification and examples contained herein.

SUMMARY OF THE INVENTION

The invention is directed to LCP filaments, fibers, yarns and monofilaments, and cords made therefrom, which have improved adhesion properties, said filament comprising a liquid crystalline polymer filament having a finish which contains about 60% or more, preferably about 80% or more, of components selected from the group consisting of esters formed between:
  (a) pentaerythritol and saturated polyols of up to 10 carbon atoms and 2 to 6 hydroxyl groups, and
  (b) a carboxylic acid of formula $C_xH_{2x-1}COOH$, wherein x=2 to 20, wherein 2 to 6 of the polyol hydroxy functions are converted to ester functions.

In one preferred embodiment of the invention, the finish is a hindered polyester having no beta hydrogen atoms on the carbon atom adjacent to the oxygen atom of the alcohol portion of the molecule. In another preferred embodiment of the invention the finish is an ester formed from the reaction of pentaerythritol and a carboxylic acid of formula $C_xH_{2x-1}COOH$, wherein x=2 to 20, and preferably between 14 and 20. A preferred ester for high denier filament application is pentaerythritol tetrapelargonate. A preferred ester for low dpf filament application is pentaerythritol tetra-isostearate because of its effectiveness to minimize filament sticking during heat treatment and thus improving conversion efficiencies. The esters selected for maximum thermal stability, minimum volatility, are the higher molecular weight tri- or tetra-functional esters which could cross-link the fiber surface by ester interchange.

DETAILED DESCRIPTION OF THE INVENTION

The term "filament" as used herein means any filament, fiber, yarn and monofilaments, or cords made therefrom, made of a liquid crystalline polymer (LCP) material of any composition. Examples and definitions of liquid crystalline materials and polymers can be found in the "Encyclopedia of Polymer Science and Engineering", Vol. 9 (John Wiley & Sons, New York 1987) pages 1–61; "Kirk-Othmer Encyclopedia of Chemical Technology", 4th Ed., Vol. 15 (John Wiley & Sons, New York 1995), pages 372–409; and on the Internet, for example, at a Mitsubishi Company web page located at http://www.angleview. LCP materials are commercially available from various sources; for example, under the tradename "VECTRA" from Ticona LLC, Summit, N.J.; under the tradename "ZENITE" from DuPont, Wilmington, Del.; under the tradename "XYDAR" from Amoco Corporation, Chicago, Ill.; under the tradename "THERMX" from Eastman Chemical Company, Kingsport, Tenn.; or under the tradename "GRANLAR" from Granmont Corporation.

LCPs may be made into filaments by methods known to those skilled in the art. One step in producing such filaments is to apply a "finish" to such filaments after they are produced, for example, by spinning a LCP material into a monofilament. This invention is directed to such finishes, and in particular to finishes whose application to such filaments improves the adhesion characteristics of the resulting filaments. The finishes of the invention are applied at levels of about 0.1 to about 5.0 wt. %, and preferably from about 0.3 to about 3.0 wt. %. The level of finish is dependent upon the application. For example, for tire cord applications the level is about 0.1 wt % to about 2.0 wt %, and preferably about 0.3 wt % to about 1.5 wt %. For other applications, for example, using LCPs in carrier belts in the paper industry or in rope applications, the finish level can be higher, up to about 5 wt %.

The finishes according to the invention may be applied to LCP filaments of any denier capable of being produced by commercial or laboratory equipment. Any method of application known to one skilled in the art may be used to apply the finish to the LCP filaments. A preferred method of application is to use a low concentration of the finish in an emulsion or in a carrier solvent such as isopropanol or perchlorethylene, or any other suitable solvent, in a double application, to improve finish uniformity.

The filaments having a finish according to the invention may be made into cords, for example, tire cords, by any method known to one skilled in the art. The finish applied to the filaments remains on the filaments in accordance with the invention and improves the adhesion of the filaments and cords to rubber and rubber coated substances. Such cords may be of any denier and filament arrangement suitable for use in tire or other applications in which the cord will be used.

Many finishes for LCP filaments are known in the art. Examples of such finishes include T-60 (active ingredient: trimethyolethane tripelargonate), T-111, XF-2724, etc., containing cross-linking esters; and other types of finishes such as T-55 (active ingredient: glycerol epoxide) and XF-2577 (active ingredient: sorbitol epoxy). Finish Type 70642, known as a chloro-hydroxy base, is a low concentration emulsion to provide better dispersion than the oil based finishes.

While many of these art-known finishes produce filaments having acceptable adhesion characteristics in some applications, they have not been found suitable for use in conjunction with rubber and rubber coated materials. For example, standard heavy and light denier PET production lubricating finishes with up to 50% hindered polyol esters are not suitable for this application because of poor adhesion, Also, surprisingly, epoxy and halohydroxy finishes of the types described in U.S. Pat. Nos. 3,793,425 and 5,328,765, known to give good adhesion with PET fibers, are likewise not suitable for this application because of poor adhesion. Therefore, new finishes having improvements in adhesion characteristics are desired for rubber-associated applications. Such improvements are particularly desired by the tire industry wherein LCP filaments are used in the production of tire cord to which rubber materials are bonded during the production of tires. In particular, it is desirous to identify a finish which can be applied to LCP filaments to reduce filament-to-filament sticking during a heat treating step by retaining its lubricating properties. Such finish, in addition to reducing stickiness and retaining lubricating properties, should also be capable of being uniformly applied and should have or impart adhesion characteristics at least equivalent to finishes known in the art, and preferably superior to those finishes known in the art.

It has been found that various carboxylic acid derivatives of selected polyols, including pentaerythritol as a preferred polyol, can impart the desired properties to various degrees. Pentaerythritol has the formula $C(CH_2OH)_4$ and is commercially available from Aldrich Chemical Co., Milwaukee, Wis. Similar carboxylic acid derivatives of other saturated polyol compounds (substances containing a plurality of hydroxyl groups) are likewise useful in practicing the invention. Polyols of up to about 10 carbon atoms and having 2 to 6 hydroxyl groups available for reaction with the selected carboxylic acids are useful to form the finish used according to the invention. Regarding hydroxyl hydrogen atoms, it is preferred that from about 70% to 100% of the hydroxyl hydrogen atoms be replaced by carboxylic acid groups. Examples of such polyols include, but are not limited to, sorbitol, arabitol, mannitol, pentaerythritol, dipentaerythritoltrimethylolpropane, penta(ethylene glycol), neopentylglycol and similar polyols; pentaerythritol, neopentylglycol, and dipentaerythritoltrimethylolpropane and similar polyols being preferred. Chemically, such sorbitol-, mannitol-, neopentylglycol-, pentaerythritol- and other polyol-carboxylic acid derivatives are esters and may be referred to as such herein. Generally, the carboxylic acids used in forming pentaerythritol and similar polyol esters are carboxylic acid of formula $C_xH_{2x+1}COOH$, where x=2–20. Preferred are the carboxylic acids having x=14–20. Specific examples illustrating the carboxylic acids used in such ester finishes are pentaerythritol tetraisostearate, pentaerythritol tetrapelargonate, pentaerythritol tetraoctanoate, pentaerythritol tetralaurate, pentaerythritol tetrastearate, pentaerythritol tetrabenzoate and similar substances. A preferred substance for monofilament application is pentaerythritol tetrapelargonate. Pentaerythritol tetraisostearate is a preferred ester for low dpf filament applications because of its effectiveness to minimizing filament sticking during heat treatment and thus improving conversion efficiencies.

Among the properties required in a finishing agent is that it be a substance which remains liquid throughout severe heat treatment conditions; for example, heat treatment at temperatures of about 250 to about 300° C. for a time of about 10 to about 24 hours in a substantially nitrogen atmosphere where the oxygen content is less than 4%, and preferably less than 2%. Additional requirements are that it does not degrade and remains on the filament or cord at levels sufficient to improve the adhesion characteristics of the filament or cord. One possible adhesion characteristic is to reduce surface fibrillation tendency by cross-linking the fiber surface through the application of the reactive finish. Non-uniformity of the adhesive finish on LCP filaments, which is considered as fibrillation prone, would result in very high stresses at local areas and cause premature failure of the adhesive bond on the fiber surface.

The invention is best exhibited by means of examples, comparing the use of finishes according to the invention. The finishes according to the invention may also contain antioxidants, emulsifiers, tints and similar additives know to those skilled in the art up to about 20% by weight.

MONOFILAMENT EXAMPLES

Example 1

Example 1 demonstrates that the mechanical properties of the heat treated high denier, round and multilobal, filaments of a liquid crystalline wholly aromatic polyester filaments, produced as described below, which were coated during spinning with about 1.5 wt % of the invention finish using a metered applicator to distribute finish uniformly. The results showed comparable properties, other than rubber adhesion which is improved and is discussed elsewhere, to those not coated with any finish.

A sample of the polymer, a thermotropic liquid crystalline wholly aromatic HBA/HNA polyester (HBA=4-hydroxybenzoic acid; HNA=2,6-hydroxynapthoic acid) sold under the tradename of "VECTRA™ A" (Ticona LLC, Summit, N.J.), was dried overnight at 130° C. under vacuum. This polymer exhibited a melting temperature of 280° C. and an inherent viscosity of 6.30 dL/g when measured in a concentration of 0.1 percent by weight in solution of equal parts by volume of pentafluorophenol and hexafluoroisopropanol at 25° C. The polymer was melted in a 1 inch diameter extruder, and the extrudate was metered using a conventional polymer meter pump to the spinning pack where it was filtered through 50/80 shattered metal. The melt was then extruded through a single hole spinneret having an aspect ratio (L/D) higher than 2 and at a draw-down ratio (DD) equal to or higher than 4. Crossflow quench was applied to the emerging filament to provide cooling and a stable spinning environment. The quench was situated 4 cm below the spinneret face, and was 120 cm long by 15 cm wide. The quench flow rate at the top was 30 mpm (0.5 mpsec). During extrusion, the as-spun monofilaments were coated with the present invention finish (identified herein as 72096; composition comprising about 95% pentaerythritol tetrapelargonate and about 5% octadecyl-3,5-di-t-butyl-4-hydroxyhydrocinnamate [Irganox 1076]). To improve finish distribution, several different finish application techniques were tried. These were as follows:

(1). By two applicators.
(2). To hot yarn (12" below spinnerette).
(3). Higher finish levels [about 2.5% finish for monofilaments with (1)].
(4). By spray.
(5). Oil in solvent (isopropanol, perchloroethylene, etc.).
(6). Use in air jet after finish application.
(7). (1) and (2) combined.
(8). (1) and (5) combined.
(9). (1), (2) and (5) combined.
(10). (4) and (5) combined For this Example 1, the following two methods were used: (a) the concentrated finish formulation (oil), and (b) the Isopropanol (IPA) solution of the finish using a 10% (by weight) 72096 and 90% (by weight) IPA. The finish was applied during spinning, prior to the monofilaments passing around a system of godets which controlled the take-up speed. The monofilaments were finally taken up on a Sahm spool winder. The coated monofilaments were then subjected to a heat treatment in stages as follows. Heat treatment of the monofilament was carried out under low tension in a flow of dry nitrogen using a programmed temperature profile. The programmed temperature profiles of each of the heat treatment of monofilaments are listed in Table 1.

Mechanical properties of the monofilaments produced in accordance with this Example 1 were measured in accordance with ASTM D3822, and the results are listed in Table 1. The monofilaments were tested at 10 inch gauge length; 20% strain rate and 10 filament break. For purposes of comparison, both round and octalobal monofilaments were extruded and heat-treated.

The data given in Table 1 clearly demonstrates that finish coated filaments of comparable properties to those without the finish can be readily made following the process conditions of the present invention.

TABLE 1

| Sample Number | Finish* (% FOF) | Finish Solvent (Vol %) | Heat Treatment Condition | Draw Down | Den. (g) | Ten. (gpd) | Mod. (gpd) | Elong. (%) |
|---|---|---|---|---|---|---|---|---|
| Round 1 | 0 | 0 | 2 hr, hold @ 230° C. 8 hr, hold @ 270° C. | 6.2 | 220 | 21.9 | 619 | 3.1 |
| Octalobal 2 | 0 | 0 | 2 hr, hold @ 230° C. 8 hr, hold @ 270° C. | 6.2 | 220 | 23.4 | 624 | 3.2 |
| Round 3 | 1.5 | 0 | 2 hr, hold @ 230° C. 8 hr, hold @ 270° C. | 6.2 | 220 | 22.3 | 621 | 3.2 |
| Octalobal 4 | 1.5 | 0 | 2 hr, hold @ 230° C. 8 hr, hold @ 270° C. | 6.2 | 220 | 24.1 | 634 | 3.3 |
| Round 5 | 1.5 | 10/90 72096/IPA | 2 hr, hold @ 230° C. 8 hr, hold @ 270° C. | 6.2 | 220 | 23.3 | 631 | 3.2 |
| Octalobal 6 | 1.5 | 10/90 72096/IPA | 2 hr, hold @ 230° C. 8 hr, hold @ 270° C. | 6.2 | 220 | 24.8 | 639 | 3.3 |

*Percent (by weight) finish on filaments prior to heat treatment, measured by the extraction method Example 2

This Example 2 demonstrates the general increase in rubber adhesion of a high denier filament of a liquid crystalline wholly aromatic polyester produced in accordance with the present invention. Round and Octalobal monofilaments of 220 denier, were extruded and heat treated as described by Example 1. The monofilaments were top coated during spinning with about 1.5 wt % of the invention finish Type 72096 using metered finish with both single and double applicators to compare finish uniformly. In this Example 2, only the concentrated finish was used.

For adhesion measurement, the filaments were treated with an epoxy based predip composition and a Resorcinol Formaldehyde Latex (RFL) adhesive by methods known to those skilled in the art. The composition of Predip was 4.0% by weight epoxy. The RFL composition was as following: the Formaldehyde to Resorcinol molar ratio (FIR) was 2.0 and the Resin to Latex weight ratio (R/L) was 0.17. The RFL also contained about 10% by weight blocked diisocyanate in its composition. The adhesion of RFL treated filaments to rubber was measured by a H-Test (Peak). The results are listed in Table 2. Lbs.=pounds (unit force) required to pull the monofil from the rubber. Std.=standard deviation. A high "lbs." value is better than a low value.

TABLE 2

| Sample Type | Finish Applicator | Finish Type | FOF (%) | H-Peak Values lbs. | Std. |
|---|---|---|---|---|---|
| Round | None | None | 0 | 8.98 | 1.48 |
| Octalobal | None | None | 0 | 9.84 | 1.35 |
| Round | Single | 100% | 1.5 | 10.08 | 1.21 |
| Octalobal | Single | 72096 | 1.5 | 11.58 | 1.25 |
| Round | Double | 100% | 1.5 | 10.65 | 1.18 |
| Octalobal | Double | 72096 | 1.5 | 13.62 | 1.40 |

Example 3

This Example 3 demonstrates the general increase in rubber adhesion as a function of improved finish distribution uniformity due to the double application of a 90% IPA diluted solution of the finish. The monofilaments of 220 denier produced in accordance with Example 2 were top coated with the current invention finish composition of 90% IPA and 10% Finish 72096. The adhesion results are listed in Table 3.

TABLE 3

| Sample Type | Finish Applicator | Finish Type | FOF (%) | H-Peak Values (lbs.) | (Std.) |
|---|---|---|---|---|---|
| Round | None | None | 0 | 8.98 | 1.48 |
| Octalobal | None | None | 0 | 9.84 | 1.35 |
| Round | Single | 10/90 | 1.5 | 11.96 | 1.85 |
| Octalobal | Single | 72096/IPA | 1.5 | 13.32 | 0.89 |
| Round | Double | 10190 | 1.5 | 14.58 | 1.03 |
| Octalobal | Double | 72096/IPA | 1.5 | 15.96 | 2.40 |

Example 4

This Example 4 demonstrates the superiority of the current invention finish as compared to the other commercially available materials. The monofilaments of 220 denier produced in accordance with Examples 3 were compared to the filaments that were top coated after heat treatment with various silane-based finishes obtained from Dow Corning. The samples were: Z-6032 (58 wt % methyl alcohol, 40 wt % amine aryl alkoxy chloride silane, 2 wt % aminoethyl aminopropyl trimethoxysilane and 0.2 wt % diethylhydroxylamine), Z-6040 (99 wt % glicidoxypropyl trimethoxysilane and <2 wt % methyl alcohol) and Z-6076 (99 wt % chloropropyltrimethoxysilane). The adhesion results are listed in Table 4.

TABLE 4

| Sample Type | Finish Applicator | Finish Type | FOF (%) | H-Peak Values (lbs.) | (Std.) |
|---|---|---|---|---|---|
| Round | None | None | 0 | 8.98 | 1.48 |
| Round | Double | 10/90 | 1.5 | 14.58 | 1.03 |

TABLE 4-continued

| Sample Type | Finish Applicator | Finish Type | FOF (%) | H-Peak Values (lbs.) | (Std.) |
|---|---|---|---|---|---|
| | | 72096/IPA | | | |
| Round | Double | Z-6032 | 5.0 | 9.51 | 0.69 |
| Round | Double | Z-6032 | 5.0 | 9.83 | 1.14 |
| Round | Double | Z-6032 | 5.0 | 8.49 | 0.86 |

Example 5

Example 4 was repeated, except in this case the monofilaments of 220 denier were first produced in accordance with Example 2 (with no finish) and then top coated, after the heat treatment, with Ciba's finish ECN-1400 (a dispersion of cresol novolac epoxy in water). The objective was to improve its surface characteristics, including rubber adhesion. The adhesion results are listed in Table 5. This example demonstrates that the application of ECN-1400 finish on top of the invention finish did not improve the rubber adhesion characteristics.

TABLE 5

| Sample Type | Finish Applicator | Finish Type | FOF (%) | H-Peak Values (lbs.) | (Std.) |
|---|---|---|---|---|---|
| Round | None | None | 0 | 8.98 | 1.48 |
| Round | Double | 10190 72096/IPA | 1.5 | 14.58 | 1.03 |
| Round | Double | ECN-1400 | 1.5 | 10.02 | 1.63 |

Example 6

Example 5 was repeated except in this case the monofilaments were top coated, after the heat treatment, with a chloro-hydroxy based finish known as finish Type 70642 (a halohydroxy finish based on U.S. Pat. No. 5,328,765) which was a low concentration emulsion to provide better dispersion than the oil based Type 72096. Based on experience with PET, this finish was expected to penetrate the fiber and provide polar groups on the fiber surface, and therefore result in improved adhesion. The method of application was similar to that for PET yarn, requiring small amount of heat in order to make it adhere better to rubber. For LCP, the monofilaments were heated by using the heated rolls to a temperature of 200° C. to 250° C. for about 0.1 seconds. The adhesion results are listed in Table 6. This example clearly demonstrates that the finish Type 70642 is not as effective as the invention finish to improve the LCP monofilament rubber adhesion characteristics.

TABLE 6

| Sample Type | Finish Applicator | Finish Type | FOF (%) | H-Peak Values (lbs.) | (Std.) |
|---|---|---|---|---|---|
| Round | None | None | 0 | 8.98 | 1.48 |
| Round | Double | 10/90 72096/IPA | 1.5 | 14.58 | 1.03 |
| Round | Double | 70642 | 1.5 | 11.12 | 1.31 |

Example 7

Example 5 was repeated except in this case the heat treated monofilaments were top coated with the finish Type 70642, after it was surface treated with 72096 at the as-spun stage. Similar to Example 5, the objective was to improve the surface characteristics including rubber adhesion. The adhesion results are listed in Table 7. This example demonstrates that the application of finish Type 70642 on top of the invention finish did not have a great impact on the rubber adhesion characteristics.

TABLE 7

| Sample Type | Finish Applicator | Finish Type | FOF (%) | H-Peak Values (lbs.) | (Std.) |
|---|---|---|---|---|---|
| Round | None | None | 0 | 8.98 | 1.48 |
| Round | Double | 10/90 72096/IPA | 1.5 | 14.58 | 1.03 |
| Round | Double | 72096 70642 | 1.5 1.5 | 11.91 | 1.11 |

YARN EXAMPLES

Example 8

A sample of "VECTRA™ A" LCP was spun into 5 dpf (denier-per-filament) filaments by extrusion at 310° C. through a forty (40) hole spinneret. A finish was applied consisting of pentaerythritol tetrapelargonate diluted to a concentration of 20 wt. % in perchloroethylene. The finish was applied to both sides of the filaments at a level of about 0.50 wt. % using commercially available twin metered finish applicators. The filaments were taken up at a rate of 2200 fpm (feet-per-minute). The filaments were then plied to produce a yarn of about 1600 denier which was then wound on a metal bobbin covered with a ceramic batting. The bobbin was placed in a heating oven in which a nitrogen atmosphere was maintained. The yarn was heated using a temperature program in which the oven temperature was gradually raised, over a time of about 6 hours, to a temperature of about 250° C. to about 30° C. below the extrusion temperature of the LCP. In this particular Example, the temperature was raised to about 280° C. Once the maximum temperature was reached, the yarn was held at that temperature for about 10 hours. Heating was then discontinued and the yarn was allowed to cool to room temperature (15–30° C.), after which the yarn was twisted and plied into cords. The characteristics of the resulting yarn are as shown in Table 8.

PET Stock=Skim adhesion rubber compound used for adhesion work with PET (polyethylene terephthalate).

GWS Stock=Goodyear wire stock, a high modulus rubber stock.

TABLE 8

| | |
|---|---|
| Yarn tenacity | 23.4 gpd |
| Cord Tenacity | 14.7 gpd |
| % Conversion (filament to cord) | 62 |
| Stiffness | 134 grams |
| % Finish retention after heat treatment | 3 |
| Adhesion Rating at 119° C. (250° F., PET/GWS stock)[a] | 4.7/2.7 | gpd = grams per denier. For a typical LCP, the as-spun yarn tenacity is about 10 gpd.
a = In peel test experiments, 5.0 is the highest value and 1.0 is lowest value.

Example 9

Pentaerythritol Tetra-isostearate in Perchloroethylene

Yarn was produced as in Example 1, except that pentaerythritol tetraisostearate as 20 wt. % in perchloroethylene was applied at a level of 0.5 wt. %. Yarn properties are as shown in Table 9.

TABLE 9

| | |
|---|---|
| Yarn tenacity | 22.5 gpd |
| Cord Tenacity | 16.1 gpd |
| % Conversion | 72 |
| Stiffness | 59 grams |
| % Finish retention after heat treatment | 38 |
| Adhesion Rating at 119° C. (250° F., PET/GWS stock)[a] | 4.3/1.7 |

Example 10

Pentaerythritol Tetra-isostearate Applied Without Solvent (Neat)

Yarn was produced as in Example 1, except that pentaerythritol tetraisostearate was applied neat (no solvent) at a level of 0.5 wt. %. Yarn properties are as shown in Table 10.

TABLE 10

| | |
|---|---|
| Yarn tenacity | 24.7 gad |
| Cord Tenacity | 17.0 gad |
| % Conversion | 69 |
| Stiffness | 85 grams |
| % Finish retention after heat treatment | 35 |
| Adhesion Rating at 119° C. (250° F., PET/GWS stock)* | 4.3/2.4 |

Example 11

Non-Pentaerythritol Finish (Null Sample)

Yarn was produced as in Example 1, except that a non-pentaerythritol finishing agent as 20 wt. % in perchloroethylene was applied at a level of 0.5 wt. %. It was found that the pentaerythritol substances have benefits as finishing agents over the Null Sample, and in particular for using pentaerythritol tetra-carboxylic acid derivatives in which x=14–20 as finishing agents. Such derivatives can be used neat or diluted with a solvent. It is particularly advantageous to use the finishing agent neat in order to avoid recovery, disposal or environmental emissions problems due to the solvent. Further, one can make major gains in adhesion through improved finish distribution by applying a finish in a solvent.

While cord conversion, stiffness and adhesion are influenced by a variety of factors other than adhesion, the data in the Tables indicate that using the choice of finishes in accordance with the invention produces cord with superior properties. The Tables also indicate that pentaerythritol tetraisostearate is the preferred finish for low denier yarn filaments. In a separate experiment, a total of seventeen (17) low denier yarn samples were prepared with twelve (12) filaments finished with pentaerythritol tetraisostearate and five (5) with pentaerythritol tetrapelargonate, and in all cases, the low denier yarn samples using the tetraisostearate samples performed better than the tetrapelargonate samples.

When yarn is produced in accordance with the invention, yarn sticking on the bobbins is significantly reduced and less yarn damage occurs when the yarn is unwound. In addition, on the average yarn tenacity is superior for the tetraisostearate finish than for the tetrapelargonate finish. Combining this fact with the improved conversions for the tetraisostearate allows for the production of yarn having a significantly higher tenacity than was previously possible using the same LCP and other finishes.

What is claimed is:

1. A liquid crystalline polymer filament comprising improved adhesions properties to rubber in which a liquid crystalline filament has a finish to improve the adhesion of said liquid crystalline filament to said rubber, said adhesion-improving finish comprising about 60% or more of components selected from the group of esters formed between:

(a) saturated polyols of up to 10 carbon atoms and 2 to 6 hydroxyl groups, and (b) a carboxylic acid of formula $C_xH_{2x-1}COOH$, wherein x=2 to 20;

wherein 2 to 6 of the hydroxyl functions are converted to ester functions.

2. The filaments according to claim 1, wherein the x=14 to 20.

3. The filaments according to claim 1, wherein the finish is applied to the filaments at a level of about 0.1 to about 5.0 wt. %.

4. The filaments according to claim 3, wherein the finish is applied to the filaments at a level of about 0.3 to about 3.0 wt. %.

5. The liquid crystalline polymer filament according to claim 1, wherein the saturated polyols of up to 10 carbon atoms and 2 to 6 hydroxyl groups are selected from the group consisting of pentaerythritol, dipentaerythritoltrimethylolpropane, sorbitol, arabitol, mannitol, penta(ethylene glycol) and neopentyl glycol.

6. The liquid crystalline polymer filament according to claim 5, wherein the saturated polyol is pentaerythritol.

7. The liquid crystalline polymer filament according to claim 1, wherein the esters formed between the saturated polyols of up to 10 carbon atoms and 2 to 6 hydroxyl groups and the carboxylic acids of formula $C_xH_{2x-1}COOH$, where x=2 to 20, are selected from the group consisting of pentaerythritol tetraisostearate, pentaerythritol tetrapelargonate, pentaerythritol tetraoctonate, pentaerythritol tetraurate, pentaerythritol tetrastearate and pentaerythritol tetrabenzoate.

8. The liquid crystalline polymer filament according to claim 7, wherein the ester is pentaerythritol tetrapelargonate.

9. The liquid crystalline polymer filament according to claim 1, wherein said liquid crystalline polymer filament is in the form of a yarn or a cord.

10. The liquid crystalline polymer filament according to claim 7, wherein said liquid crystalline polymer filament is in the form of a yarn or a cord.

11. The liquid crystalline polymer according to claim 1, wherein said liquid crystalline polymer filament comprises a polymer of 4-hydroxybenzoic acid and 2,6-hydroxynapthoic acid.

12. The liquid crystalline polymer according to claim 7, wherein said liquid crystalline polymer filament comprises a polymer of 4-hydroxybenzoic acid and 2,6-hydroxynapthoic acid.

* * * * *